(12) United States Patent
Axenie et al.

(10) Patent No.: US 12,166,779 B2
(45) Date of Patent: Dec. 10, 2024

(54) DEVICE AND METHOD FOR ANOMALY DETECTION ON AN INPUT STREAM OF EVENTS

(71) Applicant: Huawei Cloud Computing Technologies Co., Ltd., Gui'an New District (CN)

(72) Inventors: Cristian Axenie, Munich (DE); Radu Tudoran, Munich (DE); Stefano Bortoli, Munich (DE); Mohamad Al Hajj Hassan, Munich (DE); Goetz Brasche, Munich (DE)

(73) Assignee: Huawei Cloud Computing Technologies Co., Ltd., Gui'an New District (CN)

( * ) Notice: Subject to any disclaimer, the term of this patent is extended or adjusted under 35 U.S.C. 154(b) by 865 days.

(21) Appl. No.: 17/140,882

(22) Filed: Jan. 4, 2021

(65) Prior Publication Data

US 2021/0124983 A1    Apr. 29, 2021

Related U.S. Application Data

(63) Continuation of application No. PCT/EP2018/072987, filed on Aug. 27, 2018.

(51) Int. Cl.
*H04L 9/40* (2022.01)
*G06F 18/21* (2023.01)
(Continued)

(52) U.S. Cl.
CPC ...... *H04L 63/1425* (2013.01); *G06F 18/2178* (2023.01); *G06F 18/24323* (2023.01); *G06N 20/00* (2019.01)

(58) Field of Classification Search
CPC ............ H04L 63/1425; G06F 18/2178; G06F 18/24323; G06N 20/00
See application file for complete search history.

(56) References Cited

U.S. PATENT DOCUMENTS 7,864,980 B2 * 1/2011 Evans ...................... G06T 7/20
348/169
10,200,262 B1 * 2/2019 Leverich ............. H04L 63/1425
(Continued)

FOREIGN PATENT DOCUMENTS

| CN | 106101121 A | * 11/2016 | ......... H04L 63/1425 |
| CN | 107690776 A | 2/2018 | |

(Continued)

OTHER PUBLICATIONS

Tan et al., "Fast Anomaly Detection for Streaming Data," Proceedings of the 22nd International Joint Conference on Artificial Intelligence, IJCAI, total 6 pages (2011).
(Continued)

*Primary Examiner* — Mia M Thomas
(74) *Attorney, Agent, or Firm* — Leydig, Voit & Mayer, Ltd.

(57) ABSTRACT

A device detects anomalies on an input stream of events. Each event includes a value. The device has: a modeling unit configured to represent each event into at least one histogram over a predefined tree data structure to obtain a model of the input stream; a change detection and adaptation module configured to detect a long term change of the distribution of the events in the input stream based on the model of the input stream; and a scoring unit configured to calculate an anomaly score representing the probability of an anomaly in the input stream of events based on the model of the input stream and the detected long term change.

13 Claims, 14 Drawing Sheets

(51) Int. Cl.
*G06F 18/243* (2023.01)
*G06N 20/00* (2019.01)

(56) References Cited

U.S. PATENT DOCUMENTS

| | | | | |
|---|---|---|---|---|
| 10,339,380 | B2* | 7/2019 | Greenberg | G06V 10/95 |
| 10,459,827 | B1* | 10/2019 | Aghdaie | G06F 11/0751 |
| 10,509,695 | B1* | 12/2019 | Averbuch | G06N 20/00 |
| 10,743,809 | B1* | 8/2020 | Kamousi | G16H 50/30 |
| 10,873,456 | B1* | 12/2020 | Dods | H04L 9/0822 |
| 11,195,078 | B1* | 12/2021 | Wong | G06N 5/01 |
| 11,367,355 | B2* | 6/2022 | Kwatra | G06N 20/00 |
| 11,575,693 | B1* | 2/2023 | Muddu | G06F 40/134 |
| 2010/0302270 | A1* | 12/2010 | Echauz | A61B 5/076 |
| | | | | 345/589 |
| 2016/0026656 | A1* | 1/2016 | Mansour | G10L 15/183 |
| | | | | 382/305 |
| 2017/0063909 | A1 | 3/2017 | Muddu et al. | |
| 2017/0124324 | A1* | 5/2017 | Peleg | G06N 3/006 |
| 2017/0339178 | A1 | 11/2017 | Mahaffey et al. | |
| 2018/0181749 | A1 | 6/2018 | Kolacinski et al. | |
| 2018/0247220 | A1* | 8/2018 | Assem Aly Salama | |
| | | | | G06N 20/00 |
| 2018/0270312 | A1* | 9/2018 | Shah | H04L 67/125 |
| 2018/0314835 | A1* | 11/2018 | Dodson | G06F 21/552 |
| 2018/0314965 | A1* | 11/2018 | Dodson | G06N 20/00 |
| 2018/0316707 | A1* | 11/2018 | Dodson | H04L 43/16 |
| 2019/0087764 | A1* | 3/2019 | Bhushanam | H04L 63/1416 |
| 2019/0123988 | A1* | 4/2019 | Leverich | H04L 41/0686 |
| 2019/0149565 | A1* | 5/2019 | Hagi | G06N 3/042 |
| | | | | 726/23 |
| 2019/0188774 | A1* | 6/2019 | Lehr | G06N 20/00 |
| 2020/0064822 | A1* | 2/2020 | Song | G06N 3/08 |
| 2022/0101069 | A1* | 3/2022 | Jia | G06F 17/18 |
| 2022/0129666 | A1* | 4/2022 | Cherian | G06V 10/50 |
| 2022/0284392 | A1* | 9/2022 | Chandrasekhar | G06F 16/258 |
| 2023/0032388 | A1* | 2/2023 | Gershon | H04L 41/5009 |
| 2023/0133015 | A1* | 5/2023 | Wan | H04N 21/44008 |
| | | | | 386/241 |

FOREIGN PATENT DOCUMENTS

| | | | | |
|---|---|---|---|---|
| CN | 112640380 A | * | 4/2021 | G06K 9/6212 |
| GB | 2465860 A | | 6/2010 | |
| WO | 2019057288 A1 | | 3/2019 | |

OTHER PUBLICATIONS

"Apache Flink: Stateful Computations over Data Streams," https://flink.apache.org/, total 3 pages (2014).

* cited by examiner dataset=smtp_http AU ROC = 0.9956926973199911
...
smtp_http 14501 to 14600 #anomalies = 0 auc = 1.0
smtp_http 14601 to 14700 #anomalies = 1, auc =1.0
smtp_http 14701 to 14800 #anomalies = 2, auc = 0.8092783505154639
smtp_http 14801 to 14900 #anomalies = 2, auc = 0.9329896907216495
smtp_http 14901 to 15000 #anomalies = 1, auc = 0.9489795918367347
smtp_http 15001 to 15100 #anomalies = 3, auc =1.0
smtp_http 15101 to 15200 #anomalies = 1, auc = 1.0
smtp_http 15201 to 15300 #anomalies = 2, auc = 0.979381443298969
smtp_http 15301 to 15400 #anomalies = 1, auc = 0.7346938775510204
smtp_http 15401 to 15500 #anomalies = 0 auc = 1.0
...

DEVICE AND METHOD FOR ANOMALY DETECTION ON AN INPUT STREAM OF EVENTS

CROSS-REFERENCE TO RELATED APPLICATIONS

This application is a continuation of International Application No. PCT/EP2018/072987, filed on Aug. 27, 2018, the disclosure of which is hereby incorporated by reference in its entirety.

FIELD

The present disclosure relates to the field of artificial intelligence (AI), machine learning (ML) and Big Data, and provides a device and method for anomaly detection. The anomaly detection is performed on a sequence of events. The sequence of events can also be referred to as streaming data. That is, the present disclosure also relates to the field of stream processing.

BACKGROUND

Presently, machine learning for Big Data distributed stream processing is an important field of research. Streams are sequences of events (e.g. tuples containing various types of data) that are generated by various sources (e.g. sensors, machines, or humans) in a chronologically ordered fashion. The stream processing paradigm involves applying analytics, or more complex learning functions over the events in the stream. A typical approach to stream processing assumes accumulating such events within certain boundaries at a given time and applying analytics functions on the resulting collection. Such transient event collections are termed windows. More specifically, there are multiple scenarios, such as fraud prevention or predictive maintenance, in which the anomaly detection must be performed continuously and in real time (i.e. with very low latencies with respect to the time reference of the most recent update—last incoming event). Moreover, in such scenarios, the detection system must detect and accommodate changes in the stream data distribution and provide high accuracy despite the single pass (i.e. as the stream progresses infinitely, the computation capabilities have a limited time span—while in the processing system window of focus) through the window data while keeping resource consumption and processing time fixed.

Stream processing engines may be providing tools to process events on-the-fly (i.e. as they arrive in the system). In terms of data ingestion techniques, stream processing engines are able to support both data arriving in real-time from a stream source, as well as loading data that was pre-stored in a storage media. The data is typically referred to as events, and the data represents a pairing of different pieces of data, possibly with different logical meaning (i.e. an n-tuple). This data is/was generated and received in the system in a certain order. Different notions of time are considered: time of arrival, time of event generation or at least the notion of sequence order of events in case no timing source is available. Typically, stream processing can be triggered either at regular time intervals (e.g. based on the notion of a wall-clock time watermark), or at the arrival of each event. The logic of the processing is typically handled by a specific triggering function, in this case the detection of an abnormal event.

Most functions applied on a data stream, such as anomaly detection, require at any given moment in time a sub-set of the overall processed events from the stream. Namely, the functions are applied over a window, where a window is a delimitation, with respect to time or to the logical sequence of the events, that contains the events within that given boundaries (e.g. 2 hours preceding the current time). The content of these windows varies in time as new events arrive and old events fall out of the boundaries of the window and are removed. These updates need to be reflected in the function results instantly in order to guarantee correctness. Typically, a window and the processing function to be applied (i.e. in the scenario of this disclosure the anomaly detection function) are assigned to be executed on one of the machines used to run the stream processing engine. However, as data sizes can rapidly grow, particularly in the case of unbounded or large window boundaries (e.g. 1 year preceding the current time), there is the need to design an efficient and dedicated solution for such a computing system. Yet, window stream operators require large amount of resources to compute complex functions on incoming events (i.e. DAG topology creation, operator-node assignment and data aggregation), such as those found in anomaly detection (i.e. continuous estimation, detection, scoring). A typical window operator holds all events in memory, and at each triggering moment, all elements are (re-)processed to compute the window functions, as e.g. shown in FIG. 12. Noticeably, complex computations, such as those found in anomaly detection, for large windows can require both keeping large states in memory as well as the re-computation over windows with millions of events, which makes it hard to keep up with the (near) real-time requirements. This is a major issue for state of the art solutions, which prevent to obtain an adequate solution for enabling anomaly detection via machine learning in the case of stream processing.

A major problem is that existing stream technologies do not provide generic solutions for implementing anomaly detection with very low latency over event windows. This would imply to enable the (sometimes simultaneous) computation of a sequence of functions (e.g. estimation, detection, scoring) over large windows while still preserving the timing and resource constraints. This represents a challenge because it may require reprocessing large windows, with possibly millions of events, and keeping a consistent value of the global feature as the stream progresses. Also, it requires aggregating the partial results computed over the entire stream or distributed partitions of it, even if such results are produced with high rates. FIG. 13 illustrates another problem of the prior art. The anomaly detection procedure (i.e. estimation, detection, scoring) must be recomputed over windows of events that slide (i.e. progress with the stream and might share events between successive instances). However, data intensive applications may lead to windows with millions of elements, thus increasing the cost of computation. Relevant, for this problem, is data representation.

Known stream handling approaches deal with computation as window functions, an approach which is plagued by two main limitations. The first limitation is the fact that by default, each window function keeps all the events in the window buffer that grows with the number of elements in the buffer and the number of functions to compute. The second limitation of current approaches emerges from the fact that each function update requires to pass through the whole data, especially for non-associative functions. Therefore, the computation time can be long and fail to meet the real-time performance requirements (e.g. compute the function in a couple of milliseconds).

None of the present solutions provides or composes an integrated and adaptive solution to the specific problem mentioned above. Existing stream engines and related mechanisms focus on using functions that require their own window operator with dedicated window computations and keep all events in a window buffer. Such approaches can work for some types of functions, but require a re-computation over a window state for maintaining a snapshot of normal data to anomalies ratio for each incoming event. This obviously affects the real-time constraints and resource usage when scaling to high-frequency streams and long\large windows. In particular, there is no mechanism, stream operator, or solution that enables adaptive anomaly detection with:

fixed resource usage through an efficient representation, different learning modes (i.e. supervised—when labelled anomaly data is available; semi-supervised—when partially labelled data is available; unsupervised—when there is no labelled data available for training the system) for tackling a whole class of problems using a simple model of the data, and the capability to operate with very low latencies.

Presently, approaches that try to solve the mentioned problems are stream processing and machine learning for anomaly detection.

In stream processing, stream engines (e.g. Flink, Spark Streaming, Storm, Samza, and Dataflow) are relevant technologies. Stream engines have the role of processing data on-the-fly (in movement). They provide computing capabilities based on the time ordering of the stream. Depending on the specific engine, the time can be further set to refer to event time, processing time, computer time or arrival time of the events. Most of the stream engines enable some form of grouping of the events in windows. Depending on an API of the stream engine, different flexibility levels to define and to drive the computation on the window exist. The main limitation is that window operators work with user defined functions and thus they are not optimized based on function properties. Additionally, all windows keep all the data that falls within the window scope (typically in memory) even if only part of it would be used by the window function. None of these engines offers dedicated stream operators for extracting features for machine learning.

In machine learning for Anomaly Detection, anomaly detection is referred to the identification of items or events that do not conform to an expected pattern or to other items present in a dataset. Typically, these anomalous items have the potential of getting translated into some kind of problems, such as structural defects, errors or frauds. Using machine learning for anomaly detection helps in enhancing the speed of detection. Implementing machine learning algorithms provides a simple yet effective approach for detecting and classifying anomalies. Machine learning algorithms have the ability to learn from data and make predictions based on that data. There are two machine learning techniques that can enable effective anomaly detection, namely supervised and unsupervised machine learning. Supervised methods require a labeled training set that contains both normal and anomalous samples for constructing the predictive model. Theoretically, supervised methods are believed to provide better detection rate than unsupervised methods, although the cost of labelling is high. On the other hand, unsupervised techniques do not require training data. They are based on two basic assumptions. First, they presume that most of the data are normal and only a small amount of percentage is abnormal. Second, they anticipate that anomalies are statistically different from normal data. Based on these two assumptions, data groups of similar instances that appear frequently are assumed to be normal and those data groups that are infrequent are considered to be anomalies.

There have been many supervised (e.g. supervised neural networks, support vector machine learning, k-nearest neighbors, Bayesian networks, decision trees) and unsupervised methods (e.g. self-organizing maps, K-means, C-means, expectation-maximization meta-algorithm, adaptive resonance theory, and one-class support vector machine) for anomaly detection, but not so many targeting streaming data. In this context, Tan et al. introduced a binary decision tree based one-pass anomaly detection algorithm for streams in amortized linear time. The proposed model in Tan et al. is built prior to data arrival and needs constant time and memory and deals with anomaly detection and data distribution change in the same framework. The algorithm provides good results in both batch and streaming contexts but has some limitations. Due to its fixed structure its resolution is limited and a potential extension will break the resource and time performance.

In view of the above mentioned problems, the inventors have recognized that constructing a stream operator that would ensure that anomaly detection scores are emitted correctly and with low latencies, even when operating at high frequencies over large datasets, is needed in order to be able to tackle a wide range of Big Data scenarios. A dedicated mechanism needs to be created, which performs computationally and resource efficient.

SUMMARY

In view of the above-mentioned problems and disadvantages, the present disclosure provides improvements to conventional stream processing.

The present disclosure provides a device and method for detecting anomalies in the incoming stream, in a window-like and online learning fashion, as the stream progresses.

The present disclosure overcomes the resource greedy and computationally expensive state-of-the-art approaches (e.g. dimensionality reduction, statistical methods, or clustering), by providing a new specialized stream compute unit, that uses an efficient data representation (i.e. histograms) updated incrementally and an efficient change detection mechanism. The disclosure is supported by a flexible instrumentation ensuring stateful updates with low-latency, high event rates and a fixed resource budget.

The present disclosure uses an efficient data representation (i.e. using binary trees), which avoids performance degradation as the resource and computation costs grow linearly with the number of elements to be aggregated, as shown at T4 in FIG. 13.

Computation time can be kept at a minimum by using a recursive data structure that only maintains informative and relevant information (i.e. a histogram) and performs simple operations only on incoming events.

To tackle limitations of the prior art, the present disclosure provides a generic implementation for anomaly detection stream operators using: judicious local (i.e. cache memory for hot data) and remote (i.e. disk for cold data) resource allocation; flexible and optimized function implementation for estimation, detection and scoring; and constant response time. Models, such as, e.g. Tan et al., have no explicit support for supervised and unsupervised learning in a common framework, making the approach limited to the case in which only labelled data is available. The present disclosure tackles this aspect and provides a flexible switch among the different learning modes, which together with the fast, incremental execution of the algorithm allows the present disclosure to provide high detection accuracy and runtime performance.

The present disclosure is highly relevant for machine learning techniques applied to the current stream processor landscape, as it addresses the issue of performing anomaly detection in evolving data streams. The issue resides in the fact that the stream is infinite and an attempt to store it, as in traditional learning methods, is intractable in terms of resource consumption (i.e. memory) or reactiveness (i.e. the computation time of the result). Second, the stream contains mostly normal instances because by definition, the anomalous data is rare and may not be available for training. Third, the stream evolves in time, thus a learning model must adapt to different changes in the stream (i.e. concept drift) to maintain high detection accuracy. Finally, this implies the usage of window operators that possibly buffer large amounts of events. As data quantity increases in time, the required resource budget increases as well up to a point where it can make the computation too costly to respect real-time requirements, or even unfeasible (i.e. the reactiveness requirement of real time systems). The present disclosure therefore introduces a mechanism that supports a novel type of stream operator for anomaly detection using a machine learning technique: the streaming random forest (wherein the term forest relates to the fact that several tree data structures can be used by the present disclosure). This stream operator will use a fixed amount of resources—both in terms of local cache memory and computation effort. Such a specification overcomes traditional topologies which, due to their implementations, are provided initially with fixed computational resources and are either not able to adapt or excessively acquire new resources at runtime. In this case, fixed resources are likely to render over-provisioning or under-provisioning scenarios for changing streaming data rates. The present disclosure addresses this problem by operating with a very low resource footprint, through its efficient computation mechanisms. The present disclosure embeds a state machine that lays out the underlying mechanisms to tackle four main problems that typical processing algorithms face in handling evolving data streams. The first aspect is the detection of data distribution changes (i.e. non-stationarity), which inherently describes evolving data streams. The second aspect targets the accuracy of the estimation given a single pass through the data (i.e. the current window of events). The third refers to the data representation. In the present disclosure, the stream data that can be processed is modeled through its temporal frequency of items, and hence model updates need to be fast to fulfil the low-latency processing context (e.g. an incremental histogram). Finally, the fourth aspect refers to resource consumption and processing time, which should be constant despite the temporal evolution of the stream.

In this context, the underlying computations are optimized to be constructed incrementally, updating pre-computed states (i.e. stateful processing). The efficient resource usage and the incremental update (of the histograms, involving a tree data structure) enable the solution to implement change detection and model update at the same time. Additionally, the present disclosure restricts the cached data to the events that are potentially involved in the incremental updates thus keeping memory usage constant. Consequently, the streaming random forest anomaly detector will be capable of detecting anomalies over the entire stream or sub-domains of the stream with very low latencies (millisecond level). The key benefit is to enable low latency change detection and an efficient data stream modeling (i.e. using incremental histograms) over the input data stream, even for high rates of incoming events. Furthermore, as the disclosure operates with a very low resource footprint, it enables efficient learning mechanisms which can benefit from full or partial prior knowledge (anomaly labels, if available) or operate by learning the characteristics of the data autonomously. From this perspective, the system provides an adaptive machine learning scheme that is able to operate in supervised, semi-supervised or unsupervised learning respectively. This is a characteristic of the disclosed computing system, and is supported by the underlying computations. Such flexibility in selecting a learning mode offers the system the capability to either learn to generalize (i.e. from historical data), to learn to detect novelty (i.e. from partially labelled data) or to learn the underlying structure of the data. The present disclosure thus provides a solution to a fundamental challenge in complex Big Data streams, namely providing low-latency, resource, and computation efficient anomaly detection.

A first aspect of the present disclosure provides a device for anomaly detection on an input stream of events, wherein each event comprises a value, wherein the device comprises a modeling unit, configured to represent each event from the input stream of events into at least one histogram over a predefined tree data structure, to obtain a model of the input stream; a change detection and adaptation module, configured to detect a long term change of the distribution of the events in the input stream based on the model of the input stream; and a scoring unit, configured to calculate an anomaly score, representing the probability of an anomaly in the input stream of events, based on the model of the input stream, and the detected long term change.

This is beneficial because an efficient data representation (i.e. histograms), which is updated incrementally, and an efficient change detection mechanism can be used. It is further beneficial because the present disclosure uses an efficient data representation (i.e. using binary trees), which avoids performance degradation as the resource and computation costs do not grow linearly with the number of elements to be aggregated because only the information stored in the histograms by means of the binary trees is updated. That is, only a value associated with each column of the histogram changes, which avoids that the histogram grows infinitely with the number of events that are processed. This ensures that computation time can be kept at a minimum by using a recursive data structure that only maintains informative and relevant information (i.e. a histogram) and performs simple operations only on incoming events. The first aspect thus provides for low-latency, resource, and computation efficient anomaly detection.

In an implementation form of the first aspect, the tree data structure comprises splitting points and leaf nodes, wherein the histogram represents a distribution of event values in the input stream over a time period with respect to splitting points in the tree data structure.

This ensures that the values of events in the input stream can be assigned to the histogram by means of the splitting points and the leaf nodes of the respective tree data structure.

In a further implementation form of the first aspect, leaf nodes in the tree data structure are represented by columns of the respective histogram.

This ensures that values of events in the input stream are correctly assigned to columns, which correspond to a leaf node each.

In a further implementation form of the first aspect, the modeling unit is configured to update the at least one histogram over a consecutive time period based on the values of the events received during the consecutive time period.

Updating the histogram ensures that memory required by the histogram is kept constant, because information stored in the histogram (e.g. the information stored in each column of the histogram) is updated (i.e. it is amended based on the information previously stored in the histogram, and based on the value of the events received).

In a further implementation form of the first aspect, the change detection and adaptation module is configured to detect a long term change of the distribution of the events in the input stream by employing a metric calculation over a model property extracted from the at least one histogram.

Detecting a long term change of distribution of events in the input stream ensures that accuracy of anomaly detection stays high during an overall operating time of the device because the device can react to long-term changes, which do not represent anomalies in the input stream In a further implementation form of the first aspect, the change detection and adaptation module is further configured to compare the value in the at least one event to a norm of values of events previously processed in the device to detect a long term change.

This provides an effective and efficient way of long term change detection.

In a further implementation form of the first aspect, the change detection and adaptation module is further configured to detect a long term change if a predefined number of events comprise a value deviating from the norm.

This ensures that no false positive results are generated by the device because a predefined number of events has to deviate from the norm.

In a further implementation form of the first aspect, the modeling unit is configured to build a plurality of tree data structures by different combinations of splitting points and to represent each event from the input stream into a plurality of histograms over the plurality of tree data structures to obtain the model of the input stream.

This ensures that various attributes of the values in the input events can be considered, wherein for example each attribute of an input event is considered by means of a different tree data structure and corresponding histogram. The various histograms and their corresponding tree data structures in particular implement the concept of the random forest.

In a further implementation form of the first aspect, the scoring unit is configured to calculate an anomaly score based on changes in a profile of the at least one of the histograms.

This provides an effective and precise way of calculating an anomaly score.

In a further implementation form of the first aspect, the scoring unit is further configured to calculate the anomaly score by combining all histograms of the input stream model and applying a voting scheme.

This provides an effective and precise way of calculating an anomaly score, since information stored in various histograms can be considered In a further implementation form of the first aspect, the scoring unit is further configured to assign the anomaly score to the event, and wherein the device is further configured to output the score in an output stream of scores, wherein the output stream of scores relates to the input stream of events, wherein preferably each event in the input stream has an associated score in the output stream.

This ensures that each event can be provided with the corresponding anomaly score. In particular, outputting a stream of anomaly scores that corresponds to the input stream of events allows for an efficient way of operating the device because the anomaly scores can be provided in a quick manner, corresponding to the speed of processing the input events.

A second aspect of the present disclosure provides a method for anomaly detection on an input stream of events, wherein the method comprises the steps of: representing, by a modeling unit, each event from the input stream of events into at least one histogram over a predefined tree data structure to obtain a model of the input stream; detecting, by a change detection and adaptation module, a long term change of distribution of the events in the input stream based on the model; and calculating, by a scoring unit, an anomaly score representing the probability of an anomaly in the input stream of events based on the model of the input stream, and the detected long term change.

In an implementation form of the second aspect, the tree data structure comprises splitting points and leaf nodes, and the histogram represents a distribution of event values in the input stream over a time period with respect to splitting points in the tree data structure.

In a further implementation form of the second aspect, the leaf nodes in the tree data structure are represented by columns of the respective histogram.

In a further implementation form of the second aspect, the method comprises updating, by the modeling unit, the at least one histogram over a consecutive time period based on the values of the events received during the consecutive time period.

In a further implementation form of the second aspect, the method comprises detecting, by the change detection and adaptation module, a long term change of the distribution of the events in the input stream by employing a metric calculation over a model property extracted from the at least one histogram.

In a further implementation form of the second aspect, the method comprises comparing, by the change detection and adaptation module, the value in the at least one event to a norm of values of events previously processed by the method, to detect a long term change.

In a further implementation form of the second aspect, the method further comprises detecting, by the change detection and adaptation module, a long term change if a predefined number of events comprise a value deviating from the norm.

In a further implementation form of the second aspect, the method further comprises building, by the modeling unit, a plurality of tree data structures by different combinations of splitting points and representing, by the modeling unit, each event from the input stream into a plurality of histograms over the plurality of tree data structures, to obtain the model of the input stream.

In a further implementation form of the second aspect, the method further comprises calculating, by the scoring unit, an anomaly score based on changes in a profile of the at least one of the histograms.

In a further implementation form of the second aspect, the method further comprises calculating, by the scoring unit, the anomaly score by combining all histograms of the input stream model and applying a voting scheme.

In a further implementation form of the second aspect, the method further comprises assigning, by the scoring unit, the anomaly score to the event, and outputting the score in an output stream of scores, wherein the output stream of scores relates to the input stream of events, wherein preferably each event in the input stream has an associated score in the output stream.

The method of the second aspect includes the same advantages as the device according to the first aspect and its implementation forms.

A third aspect of the present disclosure provides a computer program product comprising a program code for controlling the device according to the first aspect or any one of its implementation forms, or for performing, when running on a computer, the method according to the second aspect or any one of its implementation forms.

The computer program product of the third aspect includes the same advantages as the device according to the first aspect and its implementation forms.

It has to be noted that all devices, elements, units and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of exemplary embodiments, an exemplary functionality or step to be performed by external entities is not reflected in the description of a specific detailed element of that entity which performs that exemplary step or functionality, it should be clear for a skilled person that these methods and functionalities can be implemented in respective software or hardware elements, or any kind of combination thereof.

BRIEF DESCRIPTION OF DRAWINGS

The above-described aspects and implementation forms of the present disclosure will be explained in the following description of exemplary embodiments in relation to the enclosed drawings, in which.

DETAILED DESCRIPTION

Figure 1:
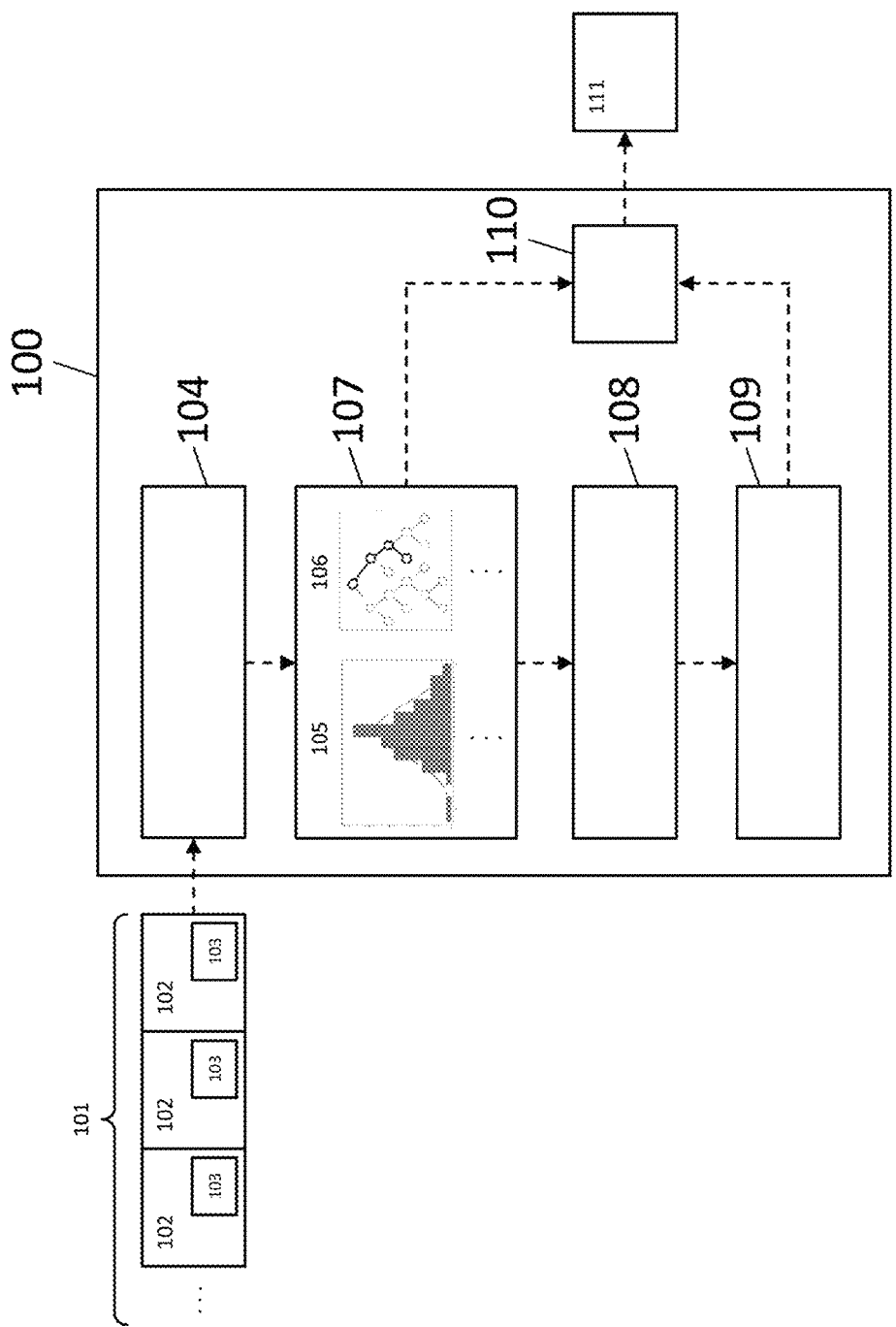
FIG. 1 shows a schematic view of a device according to an embodiment of the present disclosure.

FIG. 1 shows a device 100 for anomaly detection on an input stream 101 of events 102 according to an embodiment of the present disclosure. Each event 102 comprises a value 103. The device 100 comprises a modeling unit 104, a change detection and adaptation module 108, and a scoring unit 110.

The modeling unit 104 is configured to represent each event 102 from the input stream 101 of events 102 into at least one histogram 105 over a predefined tree data structure 106. Thereby, a model 107 of the input stream 101 is obtained.

In other words, the model 107 includes at least one histogram 105, which is obtained based on at least one tree data structure 106 that corresponds to the histogram.

The change detection and adaptation module 108 is configured to detect a long term change 109 of the distribution of the events 102 in the input stream 101 based on the model 107 of the input stream 101. The long term change 109 can in particular be determined based on a change of the shape of a histogram 105 in the model 107.

The scoring unit 110, is configured to calculate an anomaly score 111, representing the probability of an anomaly in the input stream 101 of events 102, based on the model 107 of the input stream 101, and the detected long term change 109. That is, if a long term change 109 of the histogram 105 is observed by the scoring unit 110, this change is reflected by the scoring unit 110, and an evaluation of the model 107 (and in particular of the histogram 105) is adapted accordingly.

Figure 2:
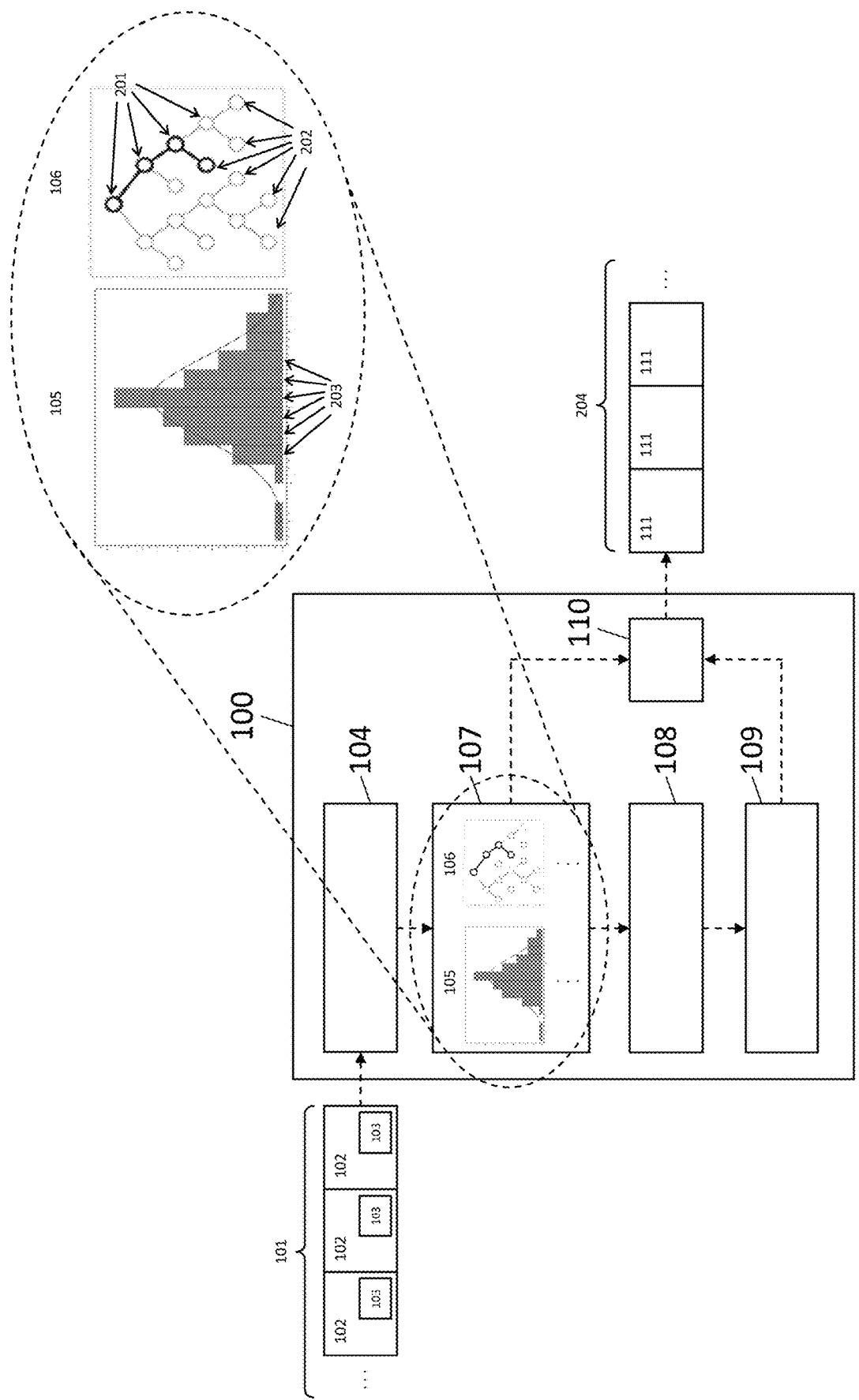
FIG. 2 shows a schematic view of a device according to an embodiment of the present disclosure in more detail.

FIG. 2 shows a device 100 according to an embodiment of the present disclosure in more detail. The device 100 of FIG. 2 includes all features and functionality as the device 100 of FIG. 1. To this end, identical features are labelled with identical reference signs. All features that are going to be described in view of FIG. 2 are optional features of the device 100.

As it is illustrated in detail in the right upper part of FIG. 2, the tree data structure 106 optionally can comprise splitting points 201 and leaf nodes 202. The splitting points 201 can be extracted from the values 103 of the stream 101, and represent (internal) nodes of the tree data structure 106. For each received event 102, its value 103 is compared to the splitting points 201 in the tree data structure 106 and the event 102 is added (e.g. counted) to the number of events 102 in the corresponding leaf node 202 based on the results of the comparison.

The histogram 105 represents a distribution of event values 103 in the input stream 101 over a time period with respect to splitting points 201 in the tree data structure 106.

The change detection and adaptation module 108 rules out changes in the event distribution that are not anomalous, i.e. changes that are recorded as a step function in the histogram 105 with no peak.

Leaf nodes 202 in the tree data structure 106 may optionally be represented by columns 203 of the respective histogram 105. That is, each column 203 of the histogram 105 grows over a time period according to the number of events 102 that are added to the leaf node 202 that corresponds to a column 203.

Optionally, the modeling unit 104 can update the at least one histogram 105 over a consecutive time period based on the values 103 of the events 102 received during the consecutive time period. That is, during the consecutive time period, based on the value 103 of the event 102, it is decided to which column 203 of the histogram 105 the event 102 is to be added, and the histogram 105 is updated accordingly. This processing is applied to every event 102 in the input stream 101 that arrives at device 100 during the consecutive time period.

Each histogram 105 is updated continuously over consecutive time periods based on the distribution of event values 103 during the considered time period.

It can be understood that a new event 102 does not lead to calculating a new histogram 105, but to updating an existing one. There can be more than one histogram 105 because there are several predetermined tree data structures 106, based on different arrangement of splitting points 201. These different trees 106 give rise to different histograms 105 which are all updated when a new event 102 is received, according to the value 103 of the new event 102.

Further optionally, the change detection and adaptation module 108 can detect a long term change 109 of the distribution of the events 102 in the input stream 101 by employing a metric calculation over a model property extracted from the at least one histogram 105. An example model property can be a large change in the histogram without a peak (e.g., a large change in the y-values with the x-values remaining the same).

Further, optionally, the change detection and adaptation module 108 can compare the value 103 in the at least one event 102 to a norm of values of events 102 previously processed in the device 100, to detect a long term change 109. That is, the change detection and adaptation module 108 calculates a norm based on a predefined amount of previously processed events 102. A value 103 of a presently processed event 102 is compared to the calculated norm, and depending on an absolute value of difference between the norm and the value 103, it is decided whether the value 103 represents a long-term change 109, or an anomalous peak value. Typically, a small absolute difference between the value 103 and norm indicates a long-term change 109, why a huge difference between 100 and norm indicates an anomalous peak value.

The change detection and adaptation module 108 optionally can detect a long term change 109, if a predefined number of events 102 comprise a value 103 deviating from the norm. That is, it is not only determined, based on an absolute difference between the value 103 and the norm, whether an event 102 corresponds to a long-term change 109 or to an anomalous peak value, but also based on the number of events 102 that has to comprise a deviating value 103. Typically, anomalies (such as peak values) only occur intermittently in a smaller number.

The modeling unit 104 can optionally be configured to build a plurality of tree data structures 106 by different combinations of splitting points 201. This implements the concept of random forests, according to which a plurality of tree data structures 106 is used to analyze the incoming input stream 101 from different perspectives, i.e. by considering different attributes of events 102 in the input stream 101.

In particular, each event 102 from the input stream 101 is represented in every histogram 105 of the plurality of histograms 105 over the plurality of tree data structures 106, to obtain the model 107 of the input stream 101.

The scoring unit 110 is configured to calculate an anomaly score 111 not only based on the model 107 of the input stream 101, and the detected long term change 109, but also based on changes in a profile of at least one of the histograms 105. A change in a profile of at least one of the histograms 105 can in particular be regarded as a more precise manner of describing the long term change 109, since the long term change 109 results in a change of the shape of the histogram 105.

Optionally, the scoring unit 110 can calculate the anomaly score 111 by combining all histograms 105 of the input stream model 107 and applying a voting scheme.

Examining the changes in the histogram 105 profile (e.g. its shape) allows for describing the changes that have taken place in a data distribution. The percentage of change in the histogram 105 profile over a number of events with respect to that of a reference number of events 102 is considered in such examination. The score 111 is calculated by using a voting scheme which sums the contents of all histograms 105 and tracks if the histogram 105 profile changes a large value of points into the region of the cumulated histograms 105.

Optionally, the scoring unit 110 can assign the anomaly score 111 to the event 102. That is, a correspondence is established between the event 102 and the anomaly score 111.

Figure 3:
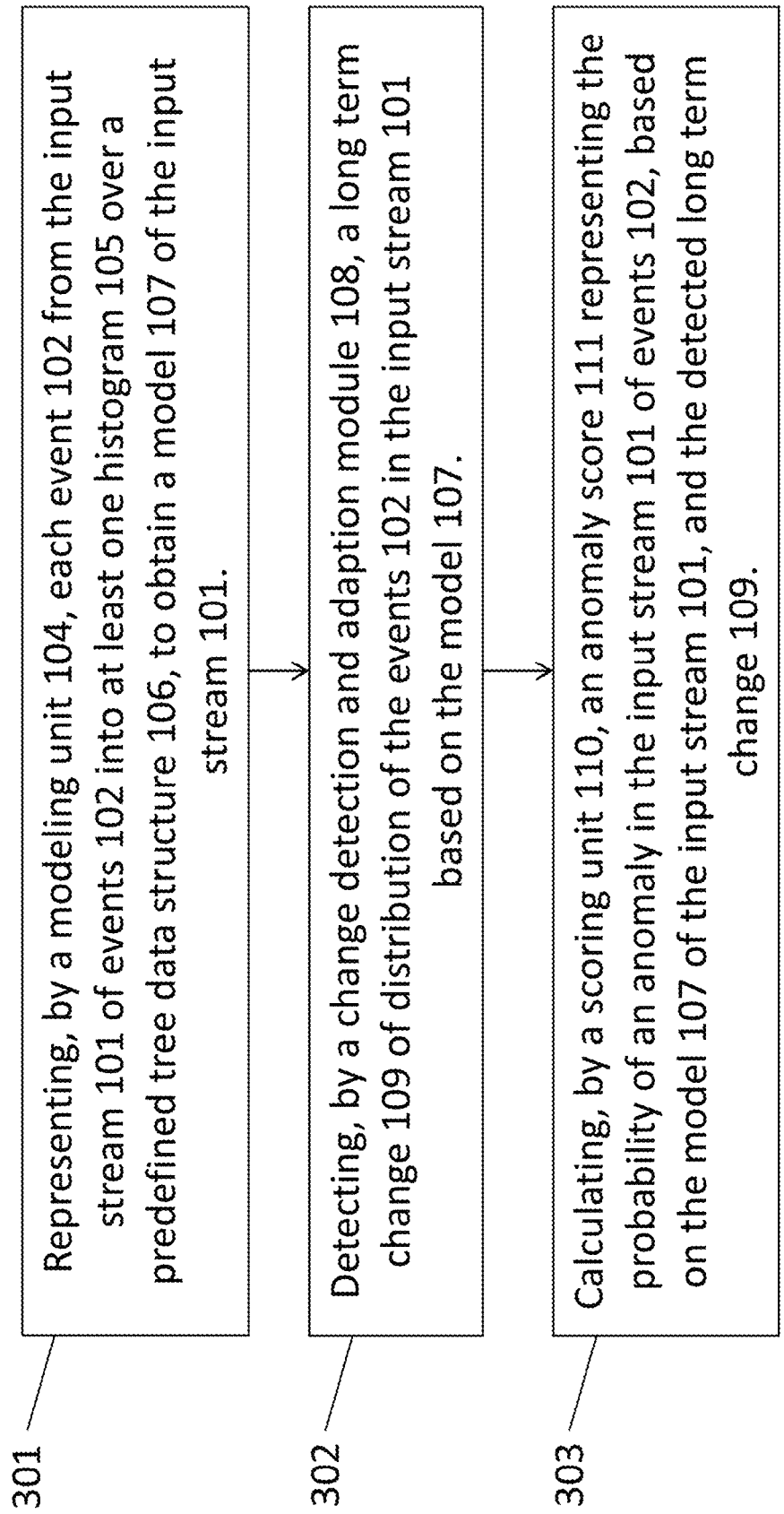
FIG. 3 shows a schematic view of a method according to an embodiment of the present disclosure.

FIG. 3 shows a method 300 for operating the device 100. The method 300 also is for anomaly detection on an input stream 101 of events 102, and comprises the following steps:

The method 300 comprises a first step of representing 301, by a modeling unit 104, each event 102 from the input stream 101 of events 102 into at least one histogram 105, over a predefined tree data structure 106, to obtain a model 107 of the input stream 101. The method 300 comprises a second step of detecting 302, by a change detection and adaptation module 108, a long term change 109 of distribution of the events 102 in the input stream 101 based on the model 107. The method also comprises a step of calculating 303, by a scoring unit 110, an anomaly score 111 representing the probability of an anomaly in the input stream 101 of events 102, based on the model 107 of the input stream 101, and the detected long term change 109.

The present disclosure also provides a computer program product comprising a program code for controlling a device 100 or for performing, when running on a computer, the method 300. The computer program product includes any kind of computer readable data, including e.g. any kind of storage, or information that is transmitted via a communication network.

Figure 4:
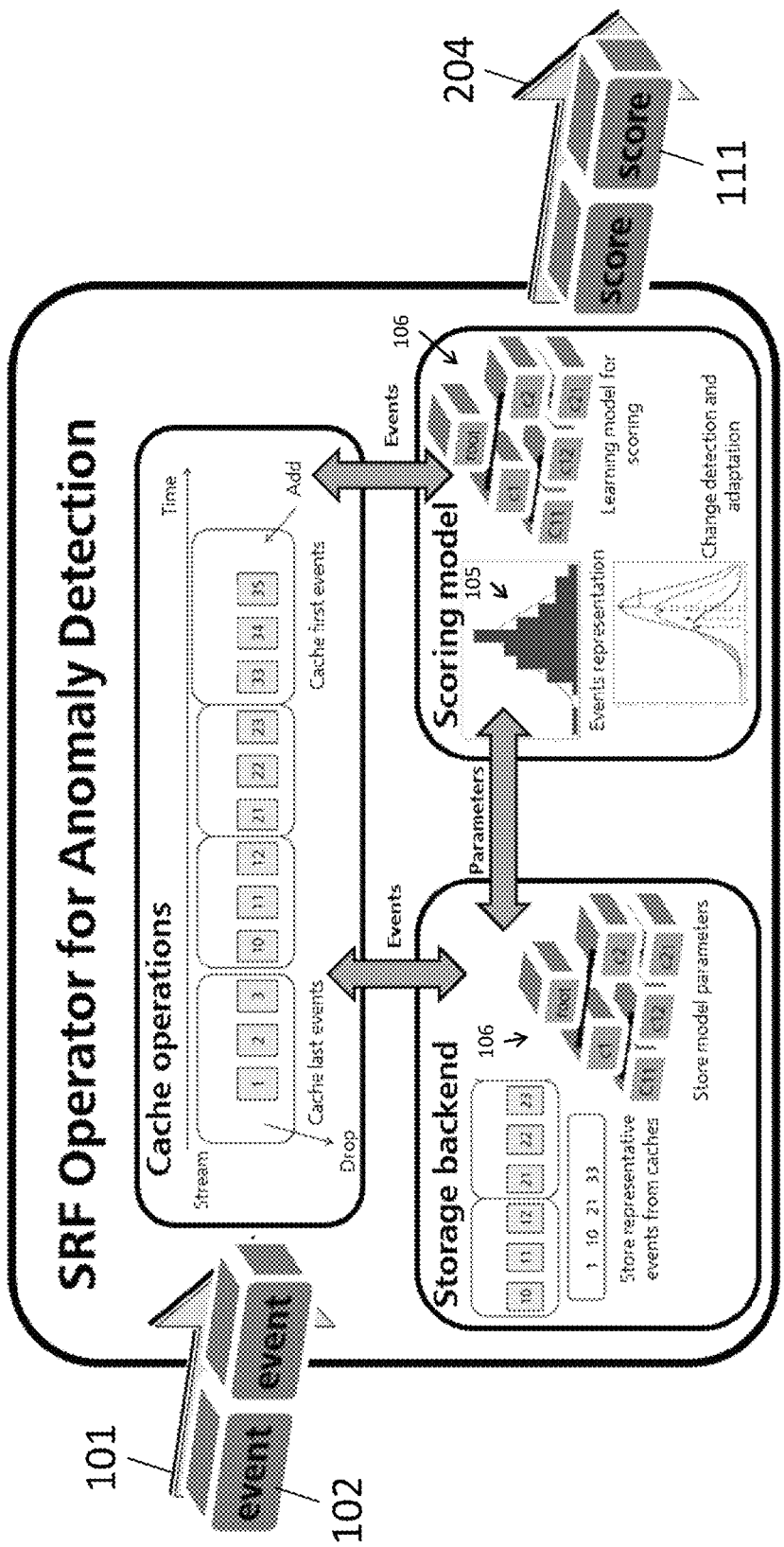
FIG. 4 shows a schematic view of an operating manner according to the present disclosure—global operation of the system's modules.

As it is now going to be described in view of FIG. 4 to FIG. 11, the present disclosure provides a processing device 100 and method 300 that provide a solution for the detection of anomalies from streams 101 of data and go beyond the traditional approaches of considering detection and scoring as simple window functions. The present disclosure introduces a new stream operator for anomaly detection capable of incrementally updating a special machine learning model 107 (i.e. a Streaming Random Forest—SRF) with fixed resource—yet supporting adaptive optimization for further resource savings—for both hot data used in updates (i.e. event add/drop cache operations) and cold data storage backend (i.e. disk or third party storage for events and model updates in medium and long term future). This behavior is achieved through a processing mechanism (i.e. data representation, change detection with a learning model for anomaly scoring) and an optimized function execution that aims to ensure a constant response time for streams 101 with high rates of incoming events 102, when applying the processing steps of the approach. FIG. 4 introduces the overall architecture of the present disclosure.

The scheme shown in FIG. 4 consists of several parts that operate in concert on the incoming data stream 101: caches operations (i.e. saving the tail elements at the end of the sliding window—chronologically old and saving the head incoming events—chronologically new), a scoring model 107 (i.e. responsible with representing events, learning the data structure and its changes and estimating the anomaly score) and a storage backend (i.e., buffers used to partition cold data stored on disk or $3^{rd}$ party storage I/O). The present disclosure proposes a modular mechanism that acts as an adaptive and efficient processing system to implement anomaly detection on streaming data 101.

Anomaly detection on streams 101 typically assumes multiple processing passes over a sliding window of available incoming data. However, data intensive applications lead to windows with millions of elements, thus increasing the cost of computation. This leads to performance degradation as the resource and computation costs grow with the number of elements to be processed and the number of passes through the window to take a decision.

Figure 5:
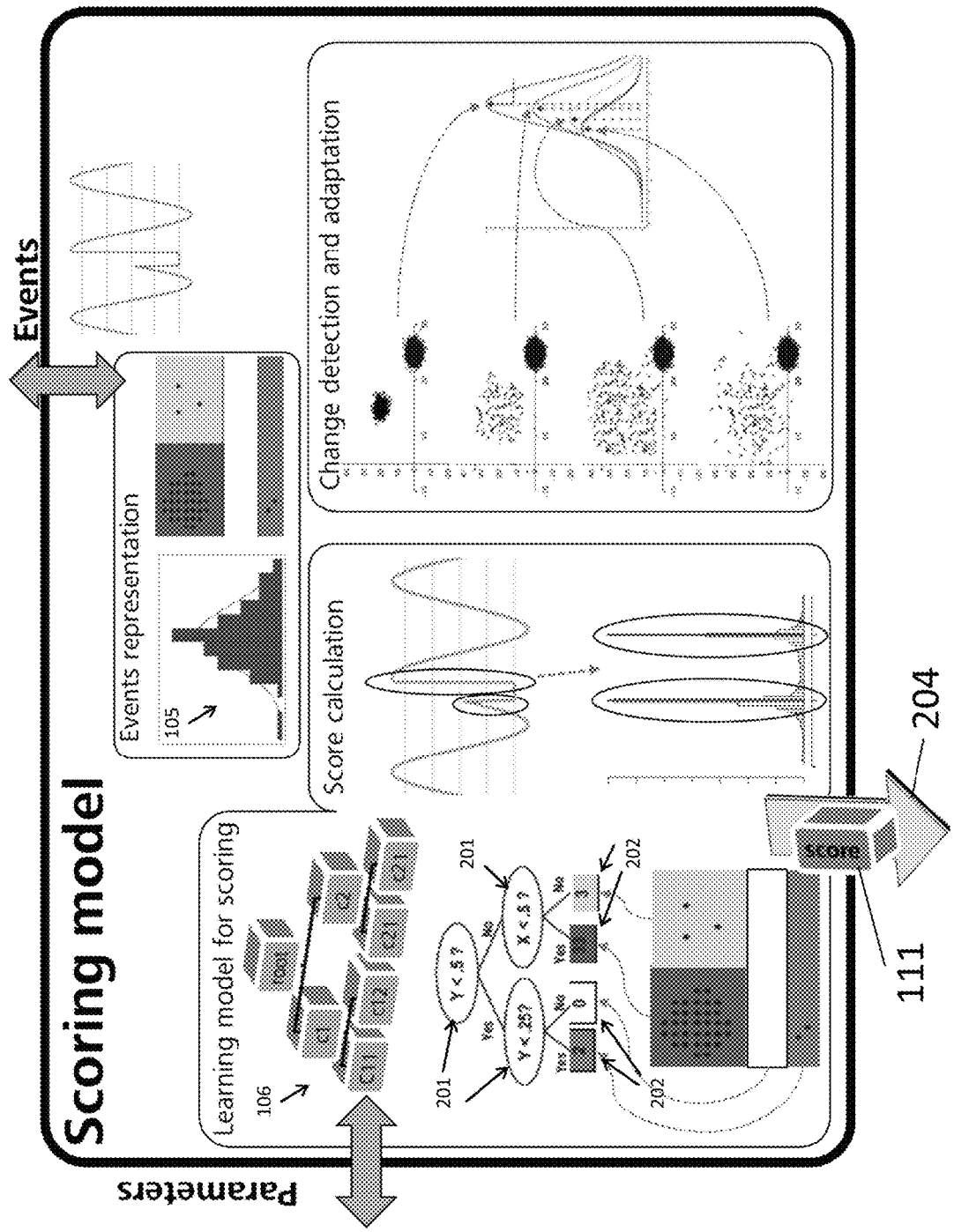
FIG. 5 shows a schematic view of an operating manner according to the present disclosure—sample functionality of each module of the system.
Figure 6:
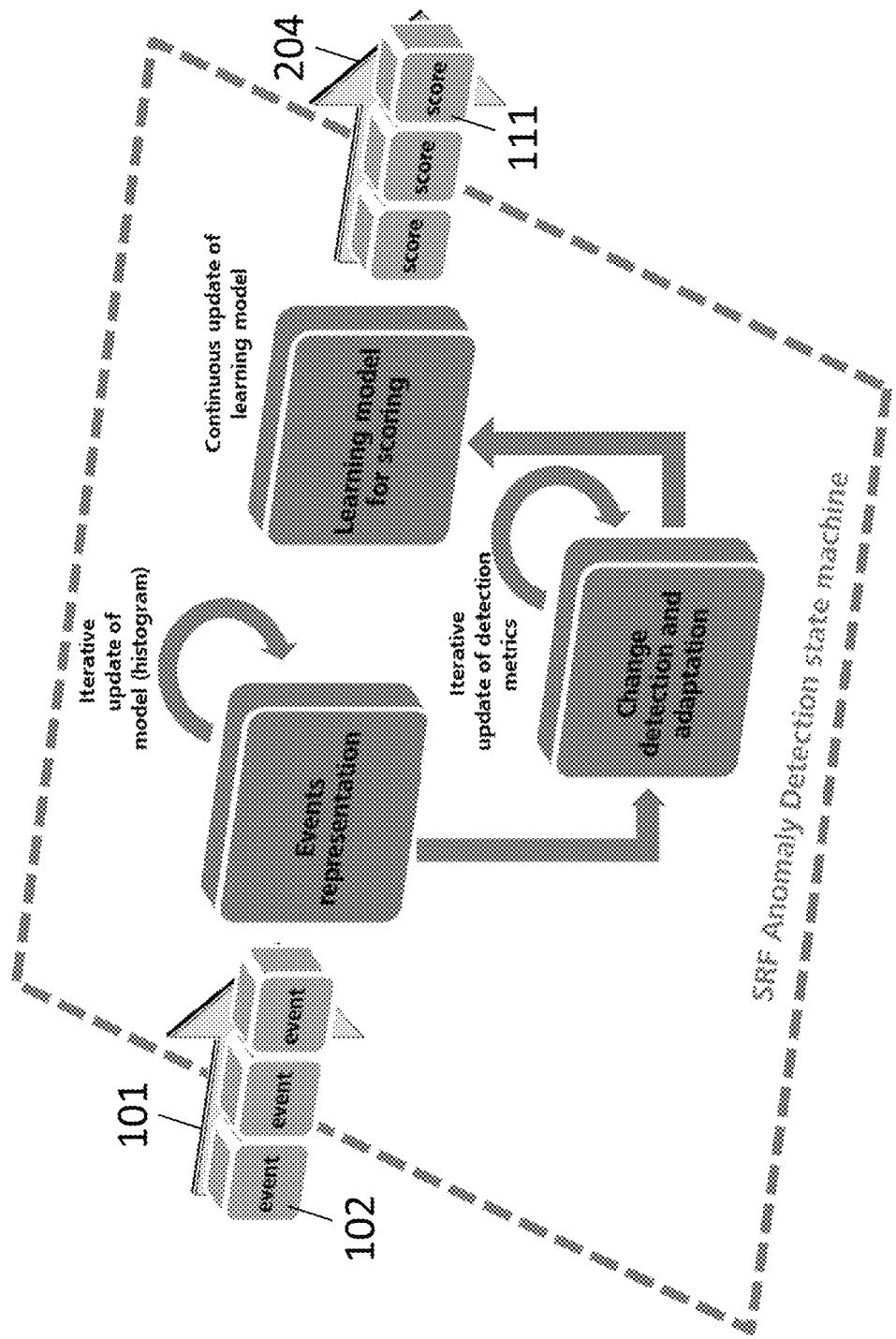
FIG. 6 shows a schematic view of an operating manner according to the present disclosure—state machine of the system.

The present disclosure is built in a modular fashion to allow each of the modules to operate individually and also in concert in order to: represent the incoming stream events 102 efficiently, to estimate data distributions changes, and to use the changes to trigger a model update for a precise and accurate detection of anomalous events, as shown in FIG. 5. The aforementioned modules are: a) the events (density) representation module (i.e. the modeling unit 104)—responsible to encode the data in an efficient model 107, a histogram 105; b) the change detection and adaptation module 108—responsible of detecting changes in the stream data probability distribution (density), which determines; c) the learning model 107 for scoring and the score calculation, which, using the change estimates, assigns an anomaly score 111 to each new event 102 using learnt distributions of events 102 in a forest of decision trees 106. FIG. 6 introduces the orchestration of the modules, where the data from the multi-dimensional stream 101 is first encoded in histograms 105 (events representation panel) over the forest trees 106 (i.e. the data model 107). Then a metric for change detection is calculated over the model 107 to detect changes in the data generating process (see FIG. 5, change detection and adaptation panel). Finally, a score 111 is calculated depending on the model parameters (e.g. a squared log function, size and level of the tree, learning model for scoring panel). The score 111 is a numeric value characterising an anomaly (e.g. high normalised value close to 1) or normal data (e.g. low value, close to 0).

The modular architecture of the present disclosure can implement a state machine operation, as e.g. described in FIG. 6, such that the incoming data is encoded in a histogram update (i.e. counting/summation) at each tree leaf level (see FIG. 5, learning model for scoring panel). Subsequently, given the updated model 107, an estimate of balanced distributions (see FIG. 5, change detection and adaptation panel) of the values in the tree leafs is calculated (e.g. by comparison). Finally, in the last stage of the state machine, the score 111 is calculated as a function of the size and the level of the trees 106 and the model 107 (i.e. the value of the histogram 105 in each leaf 202 of the trees 106) as shown in FIG. 5, in the score calculation panel. The first two modules update their internal state by incrementally calculating a histogram 105 (i.e. the data representation module) and by calculating a distribution change metric (i.e. the derivative of the histogram 105 distribution in the tree leaves 202). The modules can implement various other functions and are not restricted to the proposed functions. For example, for the data representation one can also implement a density based representation (e.g. Gaussian kernel) or a different model for the change estimation, by using for example Kolmogorov-Smirnov or Kullback-Leibler divergences instead of a decaying exponential moving average.

The present disclosure employs a transparent dataflow model for handling hot and cold data coming from the stream 101 and updating the anomaly detection model 107. As shown in FIG. 4, for each incoming event 102, the machine learning model 107 (i.e. streaming random forest) is updated. Random forests are an ensemble learning method for classification, that operate by constructing a multitude of decision trees 106 at training time and outputting the class that is the mode of the classes of the individual trees 106. The update consists in recalculating the distribution of histograms 105 in the trees' leafs 202.

Figure 7:
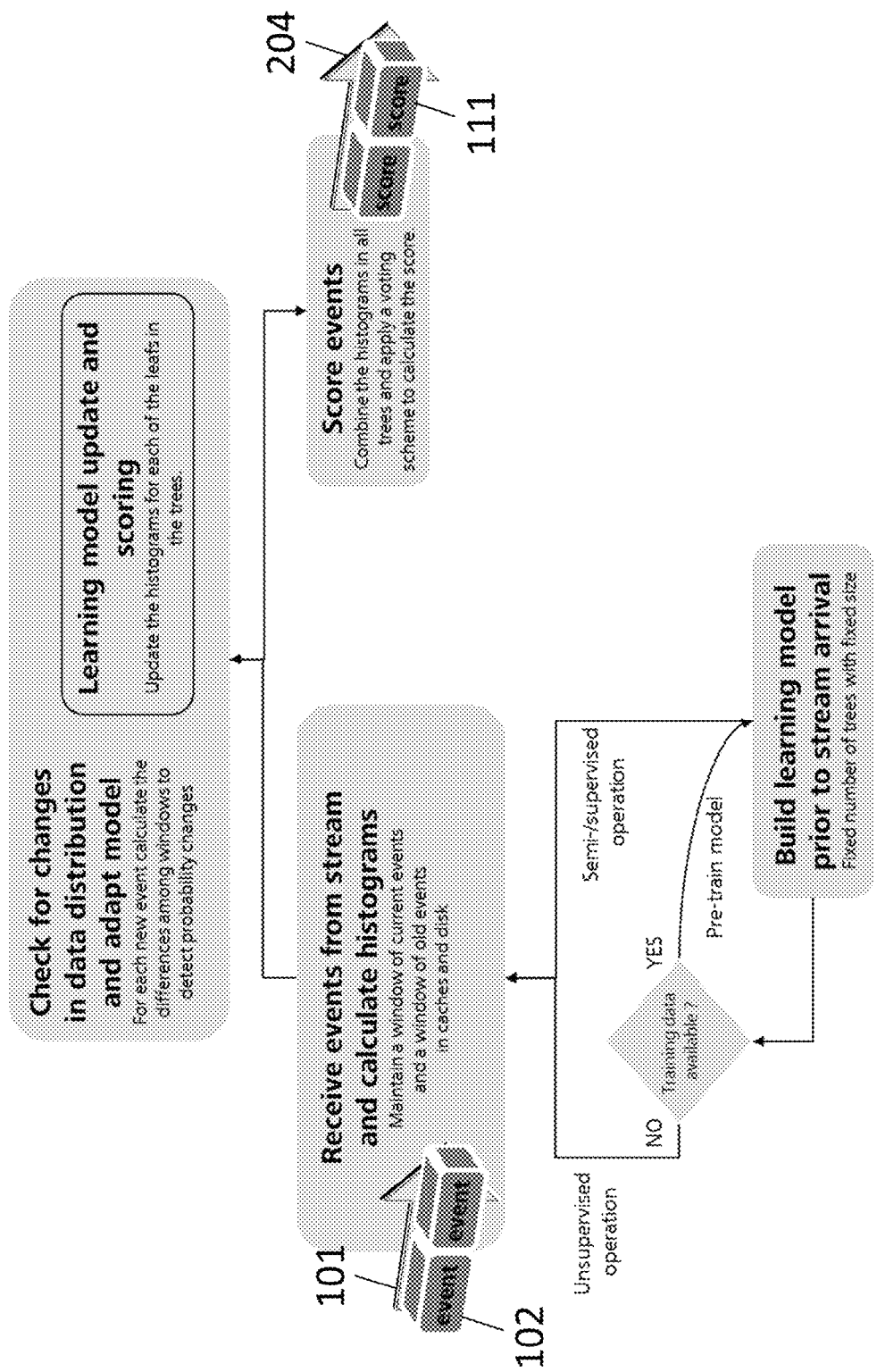
FIG. 7 shows a schematic view of an operating manner according to the present disclosure—individual module functionality.

In order to describe important aspects of functionality of the present disclosure, a flow diagram is provided in FIG. 7 that combines both functional steps in the processing pipeline as well as individual module operation for the end-to-end, i.e. event to score, operation.

Figure 8:
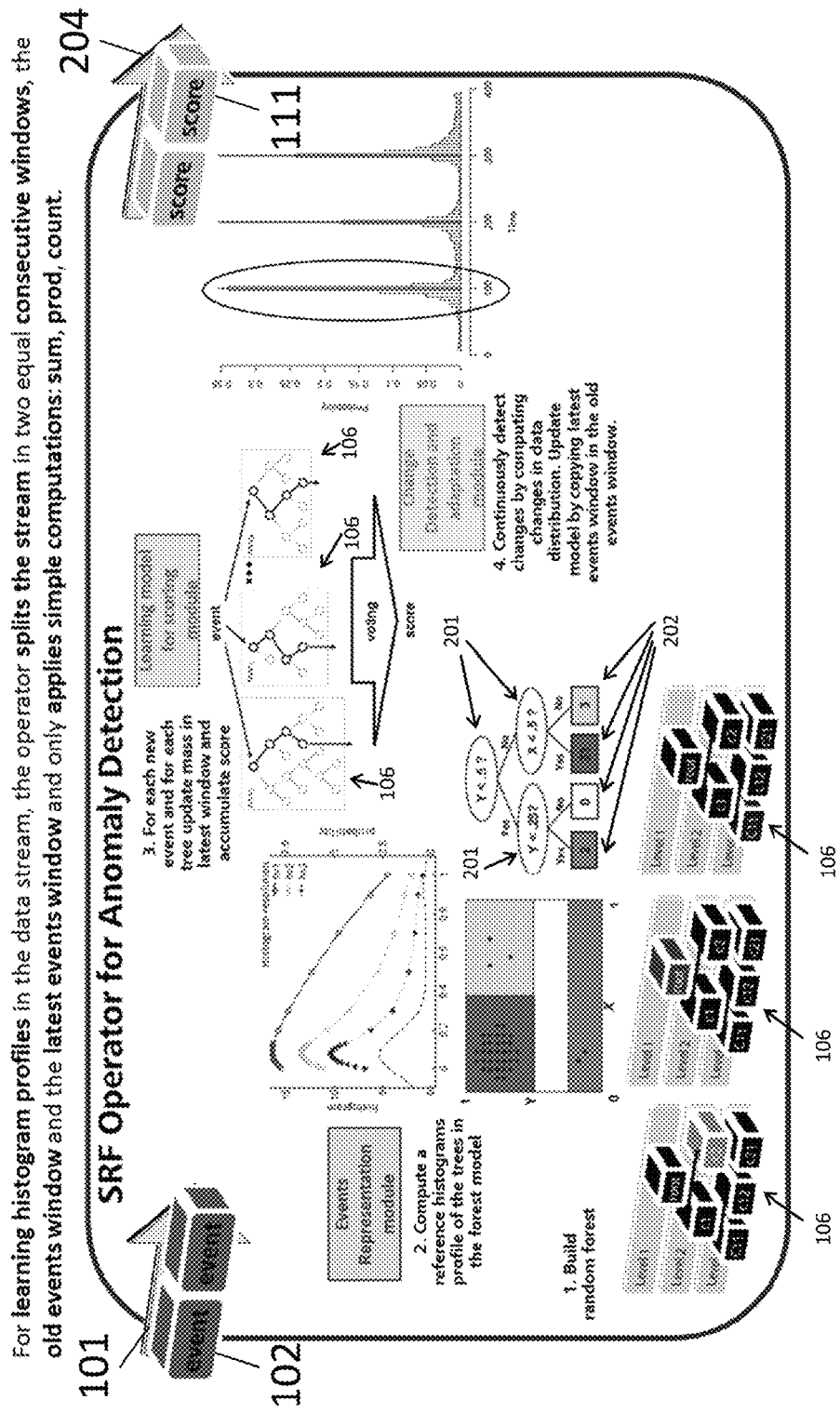
FIG. 8 shows a schematic view of an operating manner according to the present disclosure—detailed operation pipeline of system's modules.

Starting from the flow diagram in FIG. 7, a more detailed depiction of the operating principle of the present disclosure is provided in FIG. 8. The model update consists of several steps executed in sequence. First, a histogram 105 (e.g. by counting events that are assigned to columns of the histogram) is incrementally maintained over the number of events 102 represented in the forest, in FIG. 8, step 1. The update of each tree 106 is concurrent with the checks for data distribution changes, in steps 3 and 4. The system calculates an anomaly score 111, which is computed based on the distribution of the histogram 105 in the value space of the stream 101 over all trees 106 in the forest model, cf. FIG. 8, steps 2, 3.

For learning the distribution of the data stream 101, the operator splits the stream 101 in sub-windows and applies simple computations: sum, product, count. In this stage, depending on the learning mode (i.e. supervised, unsupervised, semi-supervised), the present disclosure is calculating the histograms 105 assigned to each tree 106 (i.e. the distribution of the values 103 in the input space, as shown in FIG. 8 step 2 and step 4). The present disclosure uses internally an approach to the computation of functions (e.g., sum, max, min, average, count), exploiting an efficient solution with small memory footprint and efficient computation based on discrete time management and time monotonicity. Using such an approach, the present disclosure offers low-latency (~1 ms level) and high-throughput (K events/operator) capabilities through its data flow abstraction for hot and cold data in the stream 101, while producing timely decisions (e.g. anomaly detection) on streaming data. Finally, the present disclosure offers fixed time and resource usage by using a simple learning model 107 of the data based upon only the data ranges and no pre-training is needed. Moreover, the system can be used in various learning modes, that can be configured by a user at the deployment time of the device 100: supervised, unsupervised and semi-supervised by taking advantage of a modular architecture, in which each module (i.e. events representation module (i.e. the modeling unit 104), change detection and adaptation module 108, learning model 107 for scoring module 110) can be used separately or in combination with others operations (e.g. predictive analytics, classification, regression). The present disclosure also supports the substitution of each of the modules with a different one that provides the same logical functionality but implemented with potentially different mathematical functions. For example, instead of using a model 107 based on histograms 105, a density based approach (e.g. involving kernel clustering) can be used, or instead of the recursive moving average estimate of distribution change, an incremental version of standard distribution divergence metrics (e.g. Kolmogorov-Smirnov).

In the following, a performance analysis of the present disclosure is provided, and benefits are discussed.

The present disclosure is applicable to a large number of applications that require making judgments regarding the existence of anomalies over large data streams of data. Immediate domains of applicability are internet of things (IoT), finance, fraud detection, as well as predictive maintenance. Regardless of the domain, the disclosure provides benefits such as the ones enumerated next. The Streaming Random Forest operator for anomaly detection provides real-time detection and scoring of anomalies. Moreover, it is designed as a stream-based processing component, in order for the device 100 to incrementally calculate mathematical functions and statistics, and thus to enable learning capabilities by optimizing the computation for distributed execution. Such a redefinition of computation as a global operator enables (compared to state of the art): high rates of events to be processed per second with low latency computation even across global/large data (sub-)domains. This supports anomaly detection over datasets larger than memory capacity of a used computing node, by focusing on the right data to process at each moment in time and using only simple operations to estimate, detect, and score incoming data with high accuracy.

To exemplify some of the benefits, a concrete scenario is presented, as well as the corresponding improvements brought by the invention obtained for this benchmark. This is illustrated in FIG. 9A to FIG. 11.

For exemplification, the case of network intrusion detection can be considered, which assumes detection of abnormal patterns of traffic over the network by extracting and maintaining up to date rules to detect outlier behavior (e.g. an attack "signature"). Data streams from SMTP and HTTP involving network intrusions are used. HTTP data is characterized by sudden surges of anomalies in some streaming segments. SMTP data does not have surges of anomalies, but exhibits some distribution changes within the streaming sequence. In the example, the stream has 662653 samples, and 3 features containing normal traffic and attacks: src_bytes (continuous—number of data bytes from source to destination), dst_bytes (continuous—number of data bytes from destination to source), and land (discrete—if connection is from/to the same host/port or other source).

Figure 9A:
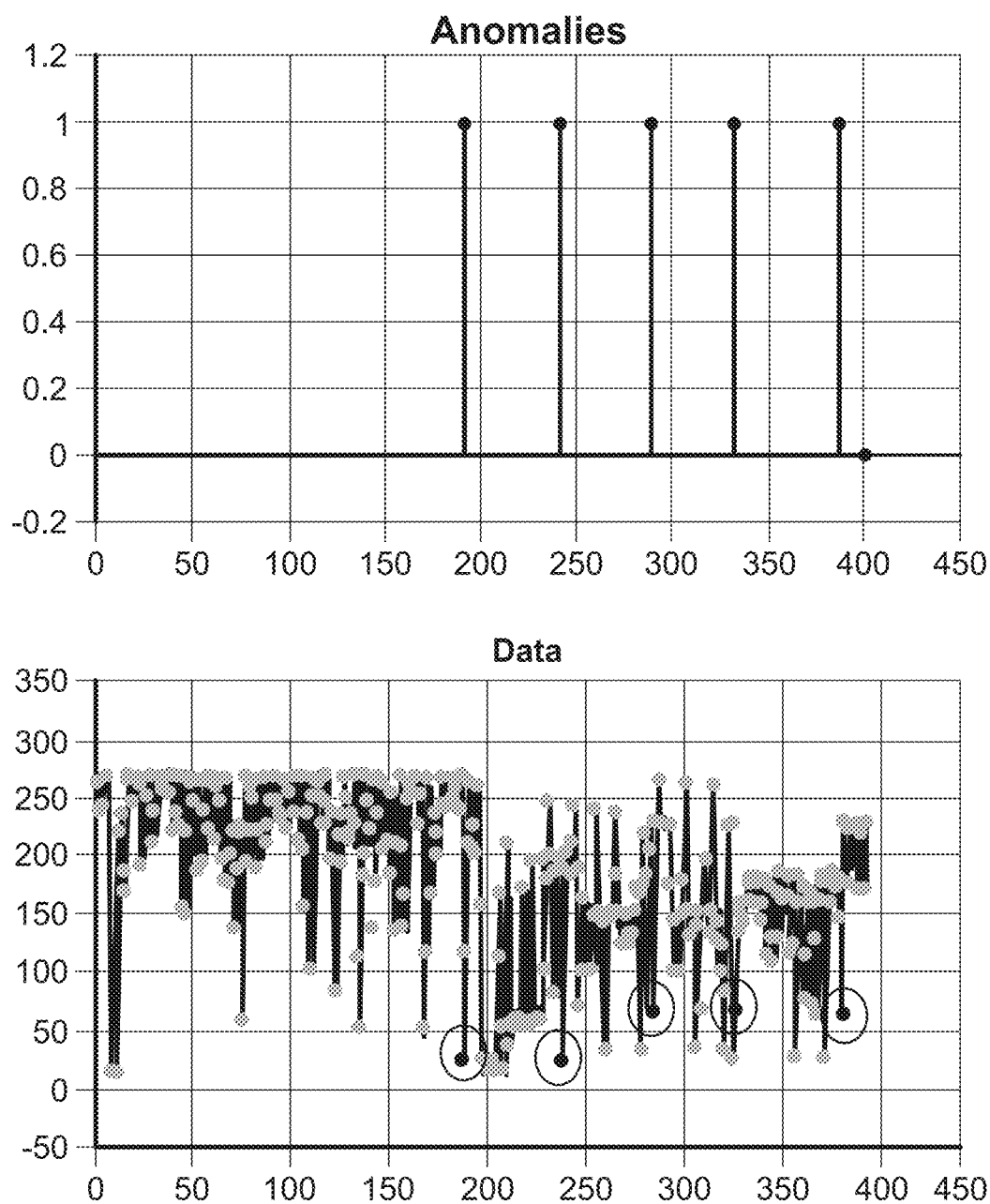
FIGS. 9A and 9B show a performance analysis result of the present disclosure on a standard benchmark.
Figure 9B:
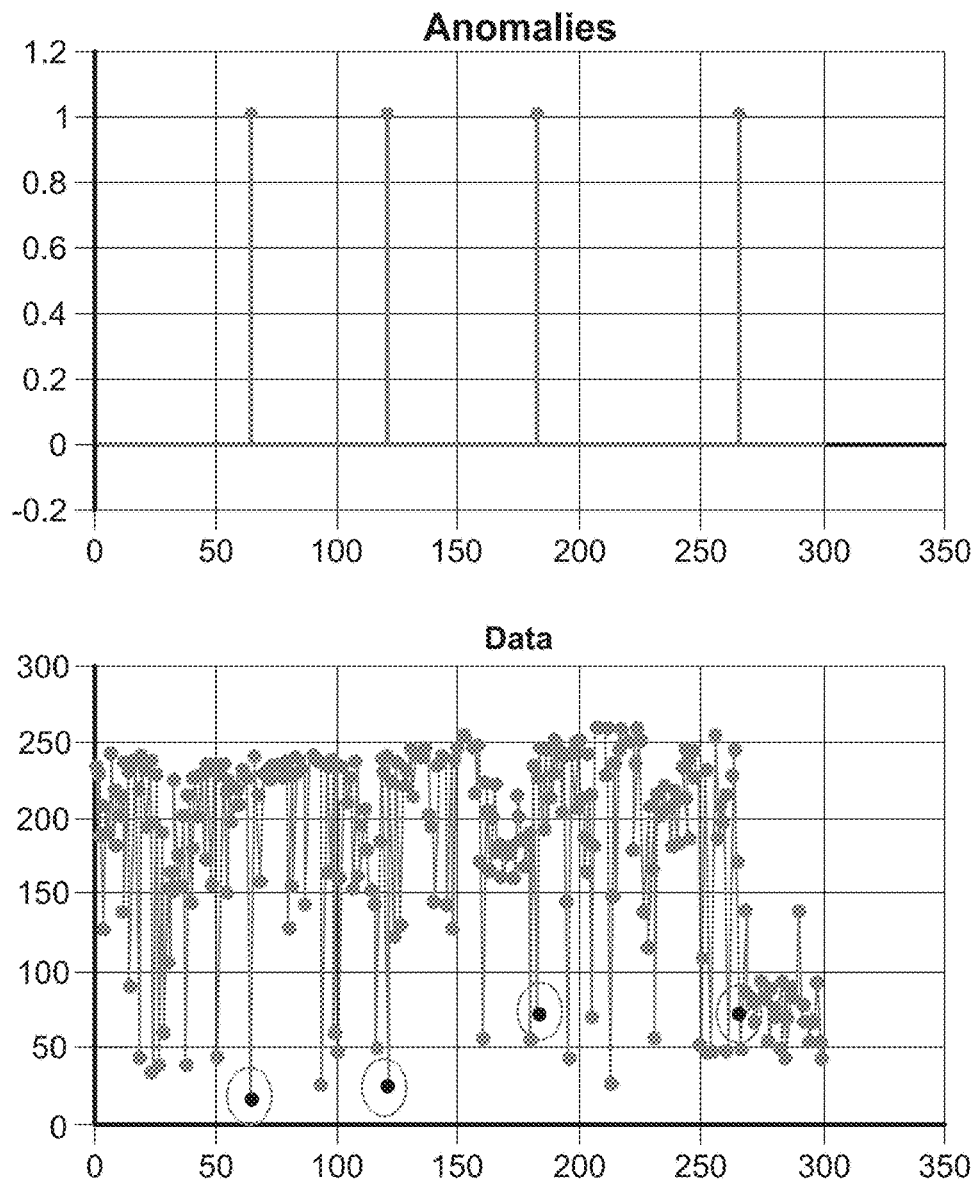
Figure 10:
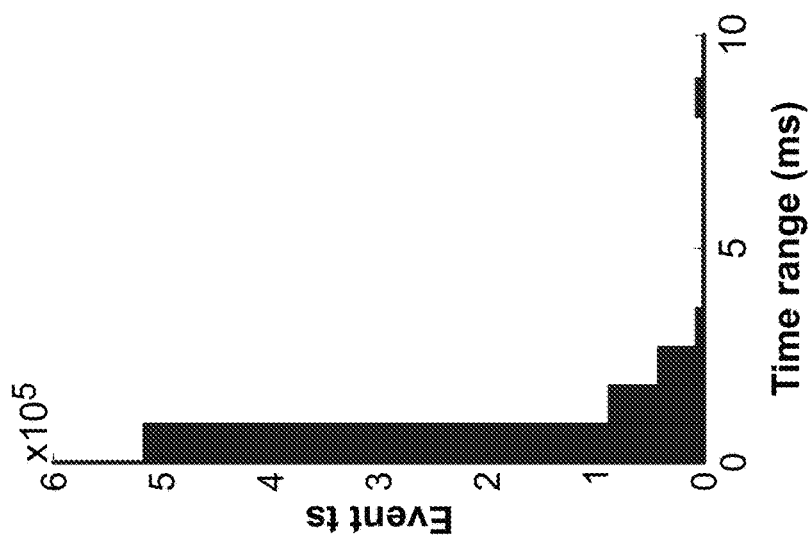
FIG. 10 shows another performance analysis result of the present disclosure on a standard benchmark.
Figure 10:
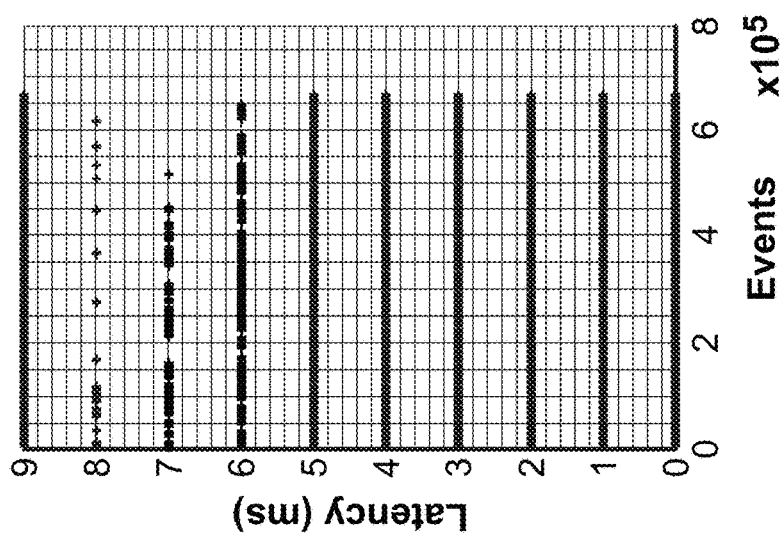
Figure 10:
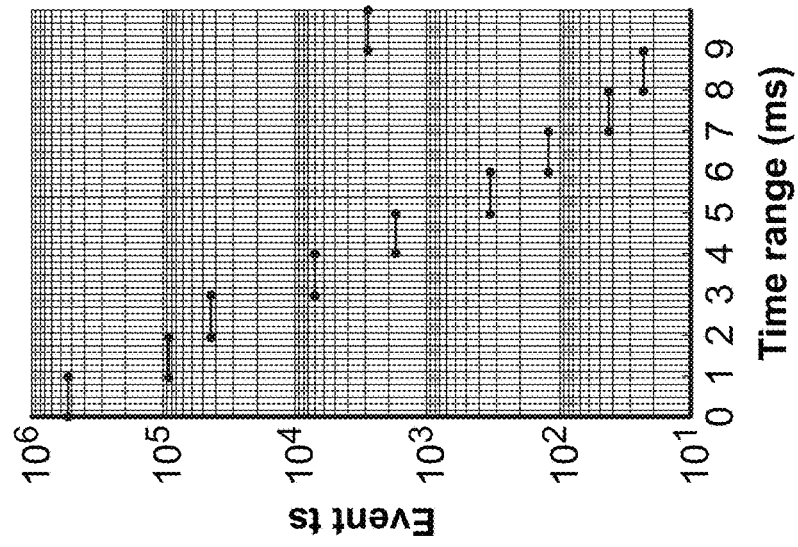
Figure 11:
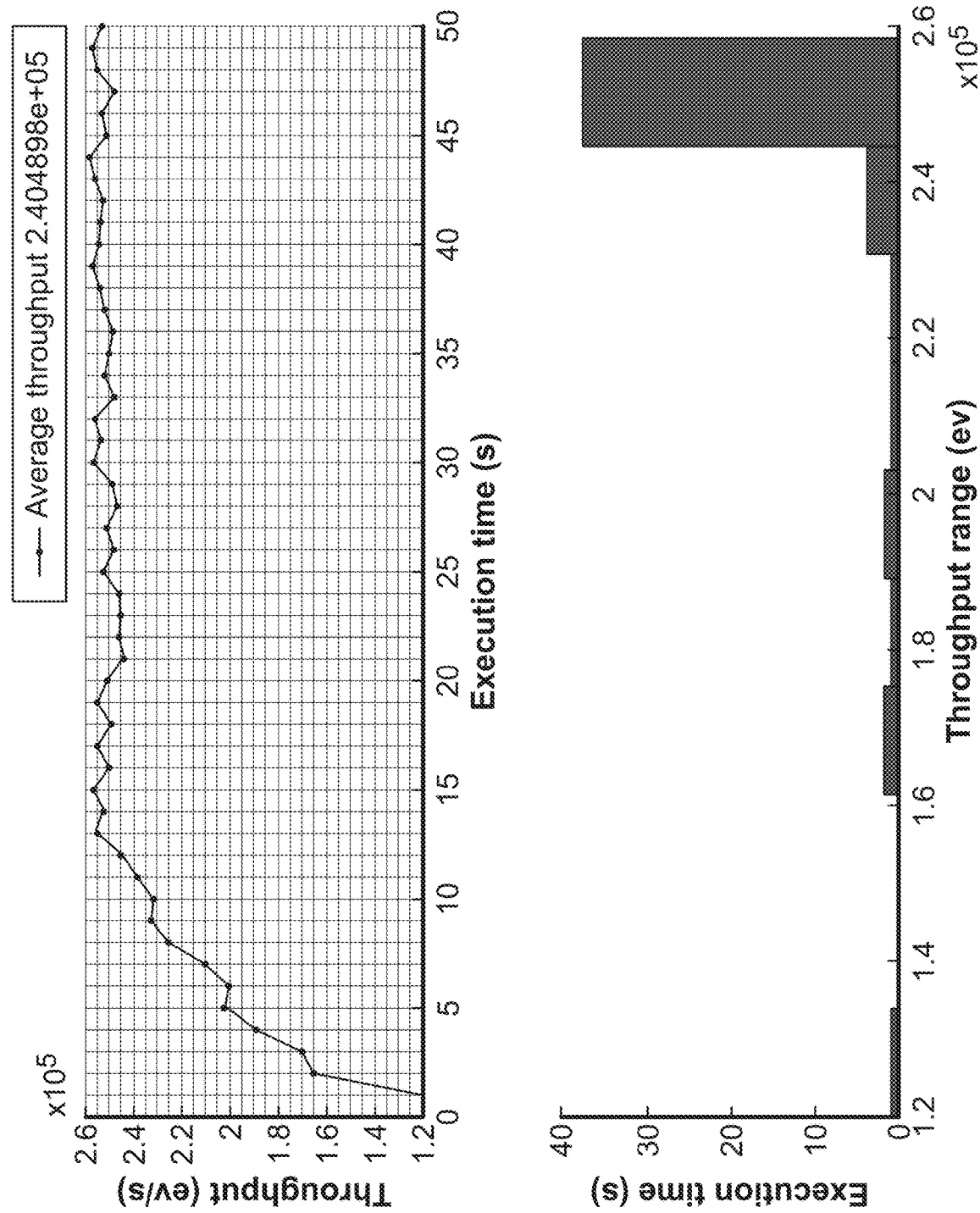
FIG. 11 shows another performance analysis result of the present disclosure on a standard benchmark.
Figure 12:
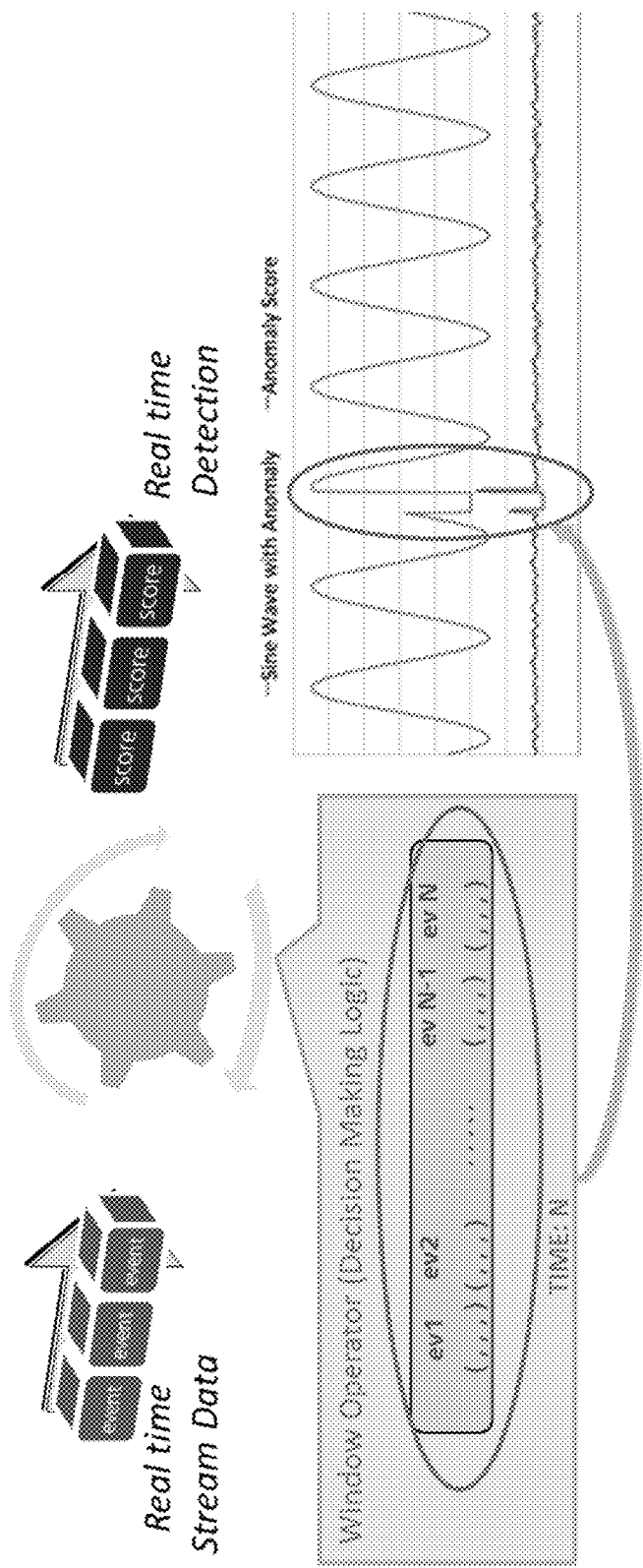
FIG. 12 shows a schematic view of stream processing.
Figure 13:
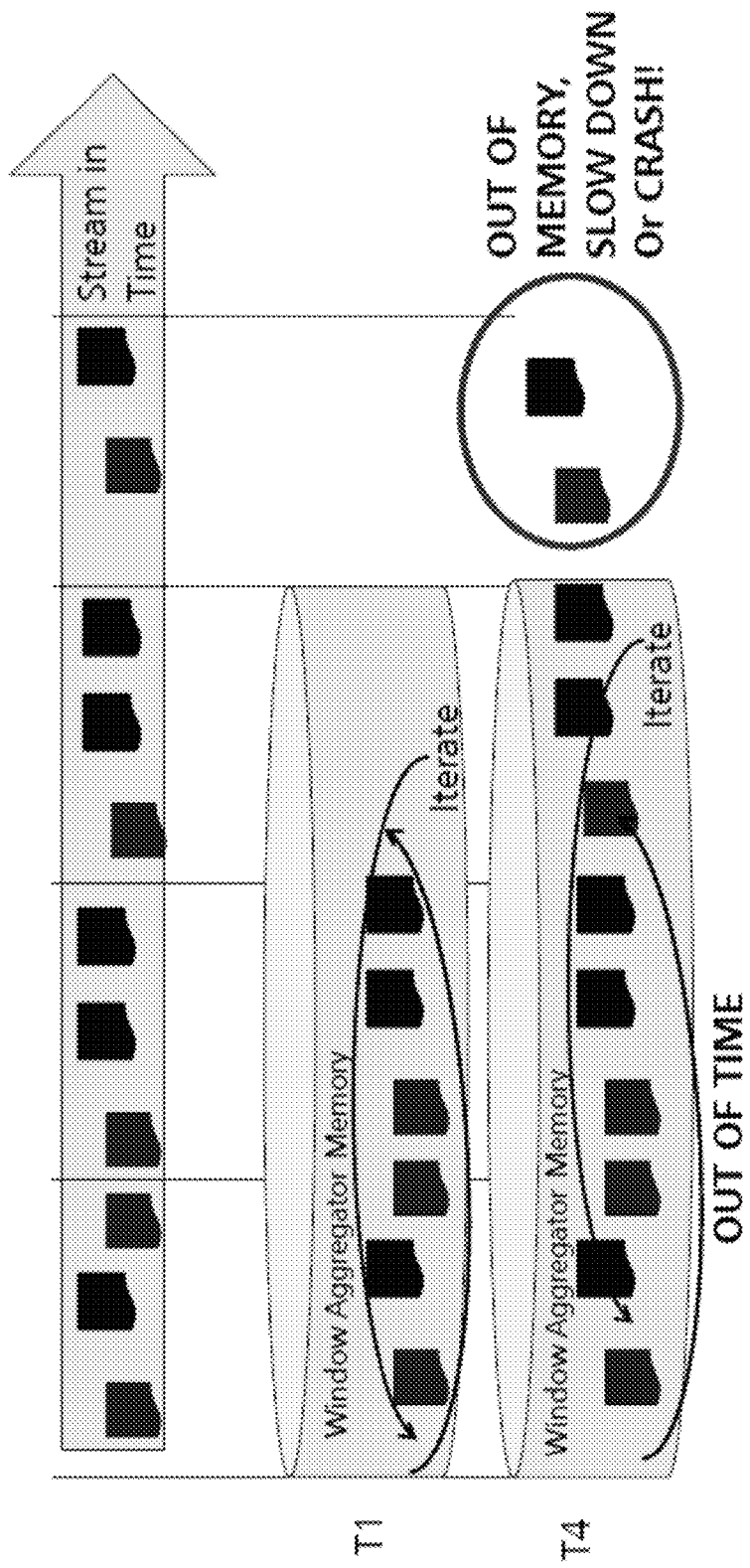
FIG. 13 shows a schematic view of stream processing.

For the experiment the stream was split in various analysis segments, each of which having a different number and type of anomalies and use AUROC (Area Under the Curve Receiver Operating Characteristic) as a metric of classification accuracy for a one-class classifier (anomaly or not). Sample data along with the performance evaluation are shown in FIG. 9.

In order to assess the runtime performance of the present disclosure, a series of experiments on a cluster composed of 3 machines with 23 CPUs is carried out and the throughput and latency of the present disclosure for a supervised learning task is evaluated. The supervised learning mode assumes the availability of a training data set that has labelled instances for normal events as well as for anomalies. Any unseen data event is compared against the model 107 to determine the class to which it belongs. In the unsupervised learning mode, the system does not need any training data because it makes the implicit assumption that normal instances are far more frequent than anomalies in the stream 101. Finally, as the third learning mode that the present disclosure supports, in the semi-supervised learning mode, the device 100 assumes that the training data has labeled instances only for the normal data and will build a model for the class corresponding to normal behavior, and use this model to detect anomalies in the test data. The preliminary performance assessment of this mode is introduced in FIG. 10 and FIG. 11, where latency and throughput measures are described.

The technical implications and benefits of the present disclosure are threefold. First, it offers a switch from static batch operation to online stream processing for anomaly detection. Unlike traditional batch model-based algorithms, the present disclosure can be built without any data; hence it is possible to create it before the arrival of a data stream. Moreover, no single static model can accurately analyze an entire data stream that evolves and experiences changes in data distribution over time, so the proposed system adapts to different parts of the data stream.

Second, the present disclosure marks a switch from online stream processing to low-latency, high-throughput enabled processing. The disclosure benefits from an operator that continuously computes, from the incoming stream, global features (e.g. sums, averages, counts or complex mathematical functions over domain partitions), in real-time, with very low latencies, over large windows with programmable resource usage.

Finally, the present disclosure supports a transition from natively supervised learning to unsupervised or semi-supervised learning. The present disclosure can operate with or without prior information about the data stream; can rapidly build an understanding of the underlying data distribution; and can easily detect changes—crucial in anomaly detection tasks.

The present disclosure has been described in conjunction with various embodiments as examples as well as implementations. However, other variations can be understood and effected by those persons skilled in the art and practicing the claimed disclosure, from the studies of the drawings, this disclosure and the independent claims. In the claims as well as in the description the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

What is claimed is:

1. A device for anomaly detection on an input stream of events, wherein each event comprises a value, the device comprising:
    a modeler configured to represent each event from the input stream of events into at least one histogram over a predefined tree data structure to obtain a model of the input stream, wherein the tree data structure comprises splitting points and leaf nodes, and wherein the histogram represents a distribution of event values in the input stream over a time period with respect to the splitting points in the tree data structure,
    a change detector and adaptor configured to detect a long term change of a distribution of the events in the input stream based on the model of the input stream; and
    a scorer configured to calculate an anomaly score, representing a probability of an anomaly in the input stream of events based on the model of the input stream and the detected long term change.

2. The device according to claim 1, wherein the leaf nodes in the tree data structure are represented by columns of the respective histogram.

3. The device according to claim 1, wherein the modeler is configured to update the at least one histogram over a consecutive time period based on the values of the events received during the consecutive time period.

4. The device according to claim 1, wherein the change detector and adaptor is configured to detect a long term change of the distribution of the events in the input stream by employing a metric calculation over a model property extracted from the at least one histogram.

5. The device according to claim 1, wherein the change detector and adaptor is further configured to compare the value in the at least one event to a norm of values of events previously processed in the device, to detect a long term change.

6. The device according to claim 5, wherein the change detector and adaptor is further configured to detect a long term change, based upon determining a predefined number of events comprise a value deviating from the norm.

7. The device according to claim 1, wherein the modeler is configured to build a plurality of tree data structures by different combinations of splitting points and to represent each event from the input stream into a plurality of histograms over the plurality of tree data structures, to obtain the model of the input stream wherein the plurality of tree data structures comprises the tree data structure, and wherein the plurality of histograms comprises the at least one histogram.

8. The device according to claim 1, wherein the scorer is configured to calculate the anomaly score based on changes in a profile of the at least one of the histograms.

9. The device according to claim 8, wherein the scorer is further configured to calculate the anomaly score by combining all histograms of the input stream model and applying a voting scheme.

10. The device according to claim 1, wherein the scorer is further configured to assign the anomaly score to the event, and wherein the device is further configured to output the score in an output stream of scores, and wherein the output stream of scores relates to the input stream of events.

11. The device according to claim 10, wherein each of the events in the input stream has an associated score in the output stream.

12. A method for anomaly detection on an input stream of events, wherein the method comprises:
 representing each event from the input stream of events into at least one histogram over a predefined tree data structure, to obtain a model of the input stream, wherein the tree data structure comprises splitting points and leaf nodes, and wherein the histogram represents a distribution of event values in the input stream over a time period with respect to the splitting points in the tree data structure;
 detecting a long term change of a distribution of the events in the input stream based on the model; and
 calculating an anomaly score representing a probability of an anomaly in the input stream of events, based on the model of the input stream and the detected long term change.

13. A non-transitory computer readable storage medium comprising instructions, which when executed by a processer, are configured to cause the processor carry out the method of claim 12.

* * * * *